(12) United States Patent
Maurer et al.

(10) Patent No.: US 7,338,038 B2
(45) Date of Patent: Mar. 4, 2008

(54) IMPACT ABSORPTION STRUCTURE (75) Inventors: Myron J. Maurer, Lake Orion, MI (US); Gavin D. Vogel, Lake Orion, MI (US); Eugenio Toccalino, Schwalbach (DE); Laxman P. Katakkar, Maharashtra (IN); Prashant S. Shembekar, Nagpur Maharashtra (IN); Srinivasan Velusamy, Tamil Nadu (IN)

(73) Assignee: Dow Global Technologies, Inc., Midland, MI (US)

( * ) Notice: Subject to any disclaimer, the term of this patent is extended or adjusted under 35 U.S.C. 154(b) by 594 days.

(21) Appl. No.: 10/799,095

(22) Filed: Mar. 12, 2004

(65) Prior Publication Data

US 2005/0200062 A1   Sep. 15, 2005

(51) Int. Cl.
*A47C 23/00* (2006.01)
(52) U.S. Cl. .................... 267/144; 267/139; 428/98
(58) Field of Classification Search ............. 188/377, 188/376; 267/144, 139, 168; 293/132, 133; 428/98, 82, 83, 84, 131
See application file for complete search history.

(56) References Cited

U.S. PATENT DOCUMENTS

| 3,086,899 | A | * | 4/1963 | Ingraham et al. ........... 428/158 |
| 3,342,666 | A | * | 9/1967 | Hull ............................ 428/184 |
| 3,940,529 | A | * | 2/1976 | Hepford et al. ............. 428/184 |
| 3,995,901 | A |   | 12/1976 | Filbert, Jr. et al. |
| 4,077,393 | A | * | 3/1978 | Mattson ....................... 126/709 |
| 4,110,857 | A | * | 9/1978 | Banister ....................... 428/184 |
| 4,852,704 | A | * | 8/1989 | Brockenbrough et al. ... 188/376 |
| 5,011,642 | A | * | 4/1991 | Welygan et al. ............. 264/167 |
| 5,435,619 | A |   | 7/1995 | Nakae et al. |
| 5,700,545 | A |   | 12/1997 | Audi et al. |
| 5,738,216 | A | * | 4/1998 | Warner ......................... 206/523 |
| 5,747,140 | A | * | 5/1998 | Heerklotz .................... 428/131 |
| 5,823,611 | A |   | 10/1998 | Daniel et al. |
| 5,833,304 | A |   | 11/1998 | Daniel et al. |
| 6,247,745 | B1 |  | 6/2001 | Carroll, III et al. |
| 6,443,511 | B2 |  | 9/2002 | Braun |
| 6,443,513 | B1 |  | 9/2002 | Glance |
| 6,547,280 | B1 |  | 4/2003 | Ashmead |

(Continued)

FOREIGN PATENT DOCUMENTS

EP   0652388   7/1997

(Continued)

*Primary Examiner*—Pam Rodriguez
(74) *Attorney, Agent, or Firm*—Dobrusin & Thennisch PC (57) ABSTRACT The present invention includes an article of manufacture with a layer with a plurality of corrugations to form an energy absorbing structure, where each corrugation has a floor and two walls connecting the floor to the base layer and the length of each corrugation is longer than the widest width of the corrugation. The present invention also includes an energy absorbing structure with a multi-layer energy absorber having a layer with a plurality of surface features and a second layer with a second plurality of surface features wherein the surface features of one layer are nested within the surface features of the other layer such that the base layers are adjacent to each other. The present invention also includes a single step method of manufacturing the energy absorbers including forming a two layer material in a single step. Further, the present invention includes a method of absorbing impact energy that involves generating heat through friction between surface features on a pair of base layers.

28 Claims, 6 Drawing Sheets

U.S. PATENT DOCUMENTS

| | | |
|---|---|---|
| 6,550,850 B2 | 4/2003 | Laborie et al. |
| 6,652,021 B1 | 11/2003 | Dykman et al. |
| 6,679,967 B1 | 1/2004 | Carroll, III et al. |
| 6,682,128 B2 | 1/2004 | Carroll, III et al. |
| 6,752,450 B2 | 6/2004 | Carroll, III et al. |
| 2002/0017805 A1 | 2/2002 | Carroll et al. |
| 2002/0058764 A1 | 5/2002 | Sonnenschein et al. |
| 2002/0106483 A1 | 8/2002 | Obeshaw |
| 2002/0142129 A1 | 10/2002 | Chaudhry |
| 2004/0178662 A1 | 9/2004 | Carroll, III et al. |
| 2005/0127718 A1 | 6/2005 | Cormier et al. |
| 2005/0161982 A1 | 7/2005 | Cormier et al. |

FOREIGN PATENT DOCUMENTS

| | | |
|---|---|---|
| EP | 0888952 | 7/1999 |
| WO | WO 82/02078 | 6/1982 |

\* cited by examiner

IMPACT ABSORPTION STRUCTURE

FIELD OF THE INVENTION

The present invention relates to structures, including methods of use and manufacture, that absorb energy upon impact.

BACKGROUND OF THE INVENTION

Many materials and structures have been utilized to absorb energy during an impact. They range from fabrics and foams to plastics. Despite these materials and structures, there continues to be a need for structures with improved energy absorbing characteristics that are cost efficient to manufacture.

Recent materials include a sheet of material with a plurality of conical protrusions emanating from one side of the sheet. For example, U.S. Pat. No. 6,247,745 shows a base with a plurality of protrusions defined on the base where the walls of the protrusions at least partially compress during energy absorption. While suitable in many applications, a cost saving in manufacture of these structures might be available if the number of steps to manufacture these materials could be reduced. In particular, these prior art products require a production process that includes formation of the base and then formation of the protrusions within the base. Furthermore, the manufacturing methods used to make known materials result in inconsistent energy absorbers. For example, the walls of a protrusion may vary in thickness depending on the location of the wall that is measured. Furthermore, the thickness of the walls of one protrusion may vary from the thickness of the walls of an adjacent protrusion. Such unevenness leads to an energy absorber that is inconsistent in its ability to absorb an impact's energy. This causes uncertainty in the effectiveness of the energy absorber.

As weight of materials is always a concern in vehicle manufacturing, there continues to be a need for lightweight structures that have comparable or improved ability, relative to existing structures, to absorb energy while also being cost-effective to consistently manufacture.

SUMMARY OF THE INVENTION

The present invention includes an article of manufacture with a layer combined with a plurality of corrugations to form an energy absorber, where the article is extruded and each corrugation has a floor and at least two walls connecting the floor to the layer and the length of each corrugation is longer than the widest width of the corrugation. The present invention also includes an energy absorber with a multi-layer energy absorber having a layer with a plurality of surface features and at least one additional layer with a plurality of surface features wherein the surface features of at least one layer are nested within the surface features of the other layer such that at least two of the layers are adjacent to each other. The present invention also includes methods of manufacturing the energy absorber structures including extruding an energy absorber in a single step and forming a two layer structure in as little as one step. Further, the present invention includes a method of absorbing impact energy that involves generating friction between surface features on at least a pair of layers.

BRIEF DESCRIPTION OF THE DRAWINGS

In the drawings:

FIGS. 2A-F show cross-sectional views of several suitable corrugation shapes.

DETAILED DESCRIPTION

The present invention is directed to an improved and alternative approach to reinforcing structures and particularly automotive vehicle structures. The invention is predicated on the discovery of a new structure, that optionally may be formed in one step, having surface features such as in the form of corrugations or protrusions, at least a two-layer material in which the surface features of one layer are nested within the surface features of at least one other layer, which in one embodiment uses friction to help absorb energy. Methods of manufacture and of use of these materials are also part of the present invention.

The energy absorber that may be formed in one step to include a layer with any of a plurality of various surface features and particularly features selected from corrugations and protrusions, which surface features optionally are integrally formed with the layer and adapted to provide the layer with increased energy absorbing characteristics.

Figure 1A:
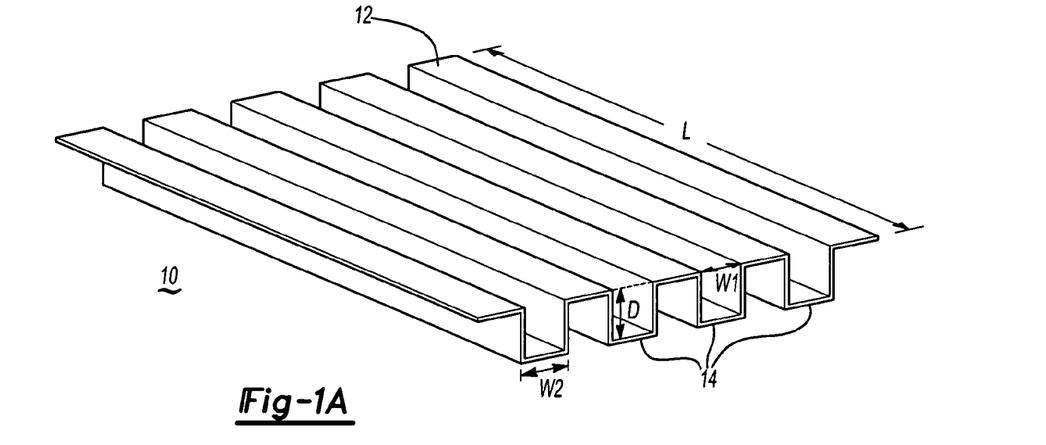
FIGS. 1A-B show perspective and close up cross sectional views of a corrugated energy absorber.
Figure 1B:
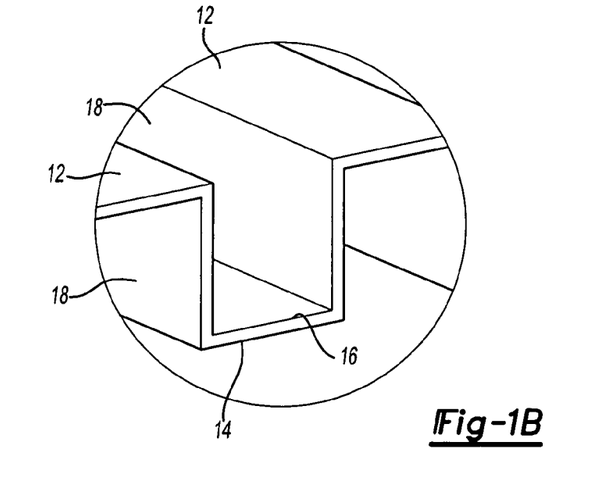

In a first embodiment, as seen in FIG. 1, an illustrative energy absorber 10 may include a base portion 12 in which a plurality of corrugations 14 have been formed, giving the energy absorber 10 a repeating structure, which may be continuous over the length of structure or discontinuous, may have repeating units of the same or different wave length, have repeating units of the same or different waveform, or combinations thereof.

For example, as shown in FIG. 1, each corrugation 14 has a floor 16 and two walls 18 connecting the floor 16 to the base portion 12. The floor and the walls may be linear, curvilinear, combinations thereof or as otherwise configured. The corrugations have at least one length L dimension that measures the distance from one end of the corrugation to the other end and at least one depth D dimension that measures the distance from the base portion 12 to the floor 16. At least one base width WI dimension that measures the distance between the two walls where the walls meet the base portion. As used herein, the floor width W2 shall be a measure of the size of the floor. The wavelength would include, for example, the distance spanning from a location on a surface feature to a similar location on an adjacent surface feature, when viewed in cross-section.

Typically, the length of the corrugation is longer than either of the widths to form a trench or groove. The corrugations typically do not have enclosed ends, but may have such. The thicknesses of the base portion, walls, and/or floor may vary along the cross-section of the structure and may be selected to maximize energy absorption of the corrugations, each of which may be varied, individually or in combination, across the layer. For example, thicker walls may exhibit increased energy absorption versus comparatively thinner walls. Further, the thickness of the floor may increase over the cross-section of the structure to provide increase energy absorption. By way of example, the thicknesses might range from about 5 mm to about 40 mm. Preferably, the thickness of base portion, walls and/or floors of the structure are substantially constant along the length of the structure.

The corrugations typically run parallel to one another, although other arrangements may also be suitable, such as corrugations radiating from a central location or from several locations. Also, the parallel corrugations that are parallel to the longest dimension of the energy absorber are preferred, but not required, because of the ease and cost effectiveness of their formation, as discussed below. Put another way, the orientation of the corrugations can be designed to be lateral or longitudinal with respect to the supporting structure of the device or vehicle (e.g. body-in-white).

The shape of each corrugation may be constant across the energy absorber, although this is not required, where the shape is generally defined by the relationship of D, W1 and W2 to each other. For corrugations where the floor and walls are linear and the floor is roughly parallel to the base portion, each corrugation has an angle or draft that is defined by the ratio of base and floor widths to each other. One illustrative situation is where the base width W1 and the floor width W2 are the same. This gives a square waveform appearance to the cross-section of the energy absorber. Where the base width W1 is longer than the floor width W2, the draft is positive and the draft is negative in the opposite situation. Preferably, the draft is between about −45° and about +45°.

Other corrugation shapes utilizing curvilinear floors, walls and base portions may also be used such as corrugations shaped to the give the energy absorber a sine waveform or other rippling or undulating waveform. Other suitable curvilinear shapes include closed loops where the walls of one corrugation touch or are attached to the walls of the adjacent corrugation or the two walls of the loop touch or are attached to each other. Open loops where the walls of adjacent corrugations and walls of the corrugation are spaced apart. Partially open loop corrugations may be suitable where either adjacent walls touch/are attached or both corrugation walls touch/are attached. Combinations of open, partially open and closed loop corrugations may also be suitable.

Figure 2A:
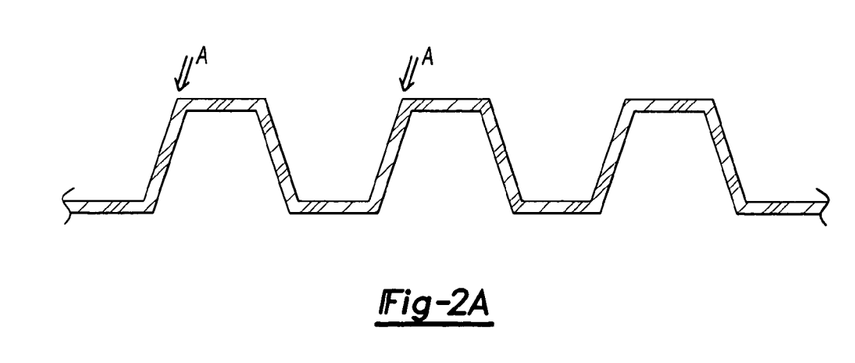
Figure 2B:
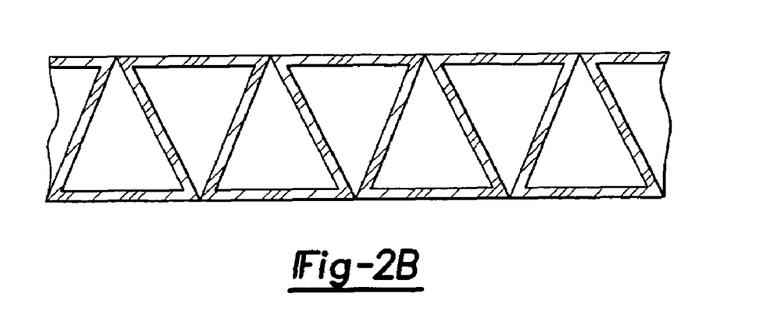
Figure 2C:
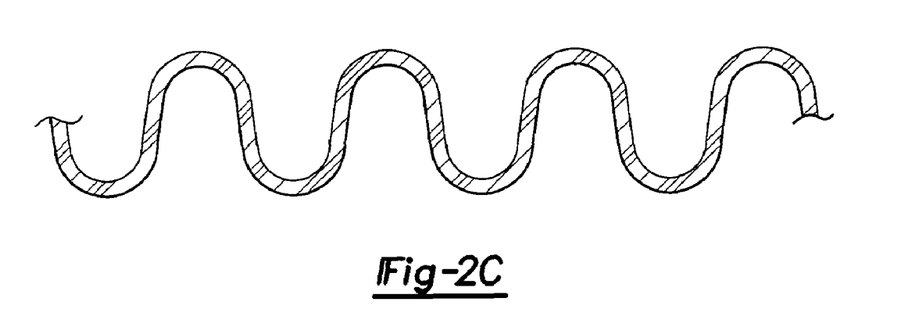
Figure 2D:
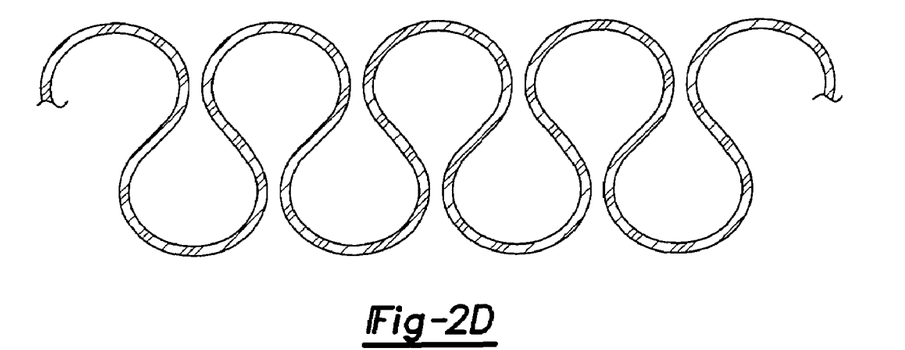
Figure 2E:
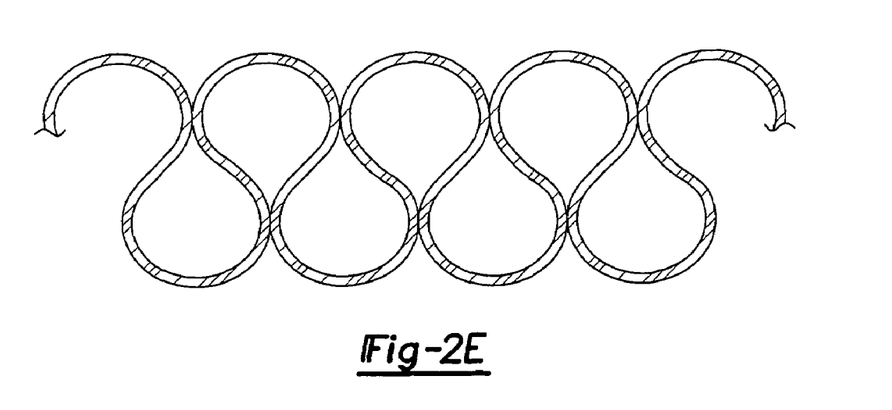

Exemplary cross-sections of energy absorbers are shown respectively in FIGS. 1A-B and 2A-E, such that the pattern of corrugations may be a square waveform (W1=W2)(FIGS. 1A-1B), a positive draft (W1>W2)(FIG. 2A), a negative draft (W1<W2) (FIG. 2B), a sinusoidal waveform(FIG. 2C), an open loop shape (FIG. 2D)or a closed loop shape(FIG. 2E). Although shown as having a constant waveform, the corrugations may have waveforms in which the sizes and shapes of corrugations vary. For example, the pattern may include alternating corrugations of different heights, widths, drafts, or combinations thereof; a series of corrugations with increasing and/or decreasing heights, widths, drafts, or combinations thereof; a series of alternating of open loops and closed loops; mixtures of shapes such as negative draft corrugations alternating with positive draft corrugations, combinations thereof or the like. Corrugation patterns other than the square waveform are preferred because these patterns offer increased impact absorption for those impacts that are not normal to the plane of the energy absorber. For example, with positive draft corrugations, the angle of impact may be more closely parallel to walls then for a square waveform. As seen in FIG. 2A, Arrow A shows the angle of impact that is substantially parallel to walls 20 in a positive draft corrugation.

The corrugations may be sized and shaped to provide at least one surface that is substantially smooth, flat or planar. This may be done for aesthetic reasons or improving the functionality of the energy absorber, such as increasing the energy absorbing characteristics of the structure or providing a surface on to which other components of the vehicle may be attached e.g. decorative covering. With two surfaces that are substantially smooth, flat or planar, as seen in FIG. 2B, the installation of the energy absorber is eased because the structure may be installed without respect to direction because both surfaces are equally functional for attaching to the vehicle or decorative coverings.

The energy absorber may also include one or securing devices such as flanges, brackets, fasteners, projections or other suitable structures that are adapted to help secure the energy absorber to the body in white of the vehicle or to another component of the vehicle, such as to a roof, a headliner, deck lid, body panel, floor panel or instrumental panel. The securing devices may include structures that are integrally formed with the energy absorber combined with separate components. Furthermore, the one or more securing devices may be located amongst or as parts of the corrugations for example a first area of corrugations may be separated form a second area of corrugations by a smooth, flat or planar portion useful securing the energy absorber. Also, a screw, snap fit fastener on other fastener may be place in one or more of the wall, base on floor of a corrugation.

Furthermore, adhesives may be used to help secure the energy absorbers. The adhesive may be any suitable adhesive for the intended application. It may be a water based adhesive, a solvent based adhesive or otherwise. It may be a single component adhesive or a multi-component adhesive (e.g., a two-component adhesive). The multi-component adhesive may use the components simultaneously or sequentially. It may be air cured, moisture cured, heat cured, radiation cured (e.g., IR or UV), radio frequency cured, solvent loss cured, or otherwise cured. It may be a melt flowable, a liquid, a film, a powder, a gel or otherwise. It may be a pressure sensitive, an RTV adhesive, a hot-melt adhesive. It may be a structural adhesive in certain applications. It should be recognized that the use of the term adhesive herein is not intended to foreclose primers or other bonding agents from the scope of the present invention.

In another embodiment, the adhesive may be a cure-on-demand adhesive, requiring a separate operation to cause the adhesive to begin to cure. In one embodiment this is achieved by using an encapsulated curing agent which is ruptured during assembly. In another embodiment this is achieved by removing a protective coating to expose the adhesive to ambient conditions. Cure can be initiated by exposing the adhesive to heat, infrared or ultraviolet light sources, or to shearing forces and the like. Additionally, the adhesive may be initiated by an organoborane amine complex, such as those mention in U.S. 20020058764, which is incorporated by reference. Of course, it is always possible to employ an adhesive that does not have cure on demand capability.

An adhesive selected from any suitable adhesive family may be employed such as polyesters, polyamides, polyurethanes, polyolefins, epoxies, ethylene vinyl acetates, urethanes, acrylics, silanes, thioethers, fluorosilicones, fluorocarbons, combinations thereof or the like. The adhesive may be a high temperature epoxy resin, a polyimide, a hybrid polyimide/epoxy resin adhesive, an epoxy novolac/nitrile rubber adhesive, a polythioether epoxy, combinations thereof or the like.

The energy absorbers of the present invention may be installed without respect to the expected direction of impact. Typically, the material will be installed so that the floors of the surface features are adjacent to the vehicle component that is to be padded with the base portion spaced apart from the vehicle component. But the opposite installation may also be utilized, where the base portion is place adjacent to the vehicle component. Also, the energy absorbers may be installed without regard to expected angle of impact. Preferably, the energy absorber will be installed such that the expected angle of impact is normal to the plane of the energy absorber, but this is not necessarily the case. In fact, the energy absorber may be installed such that the expected angle of impact is parallel to the plane of the energy absorber or at angle in between normal and parallel to the plane of the energy absorber. Indeed, often the expected angle of impact cannot be predicted. In addition to installation at the time of manufacture of the vehicle, the energy absorbers may be installed aftermarket; for example, as part of an effort to remanufacture or repair the vehicle. Upon conclusion of the useful life of a vehicle, the present invention also contemplates steps of removing and recycling the structure.

Figure 3A:
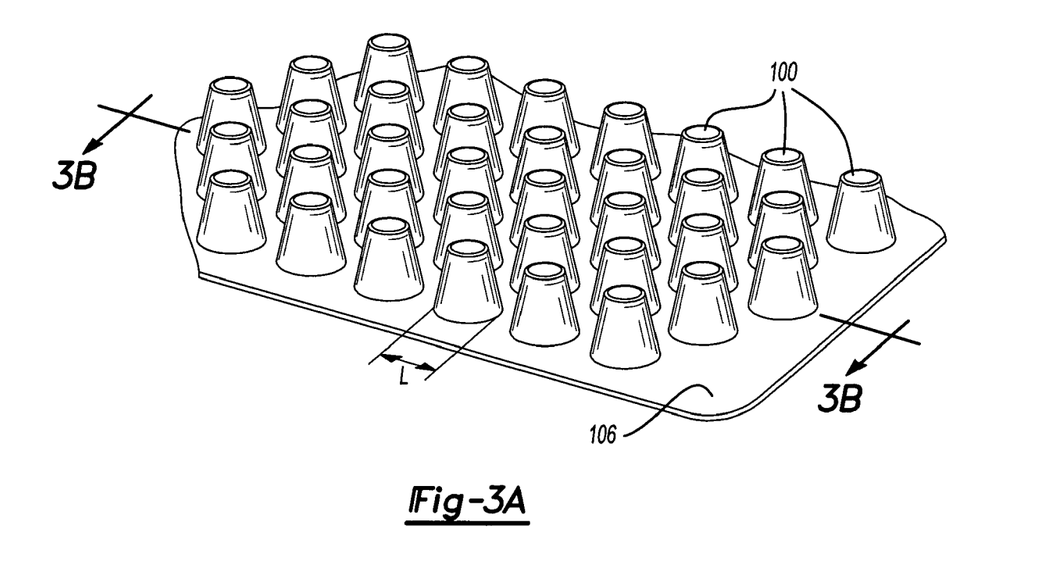
FIGS. 3A-B show perspective and cross sectional views of an energy absorber with a plurality of protrusions.
Figure 3B:
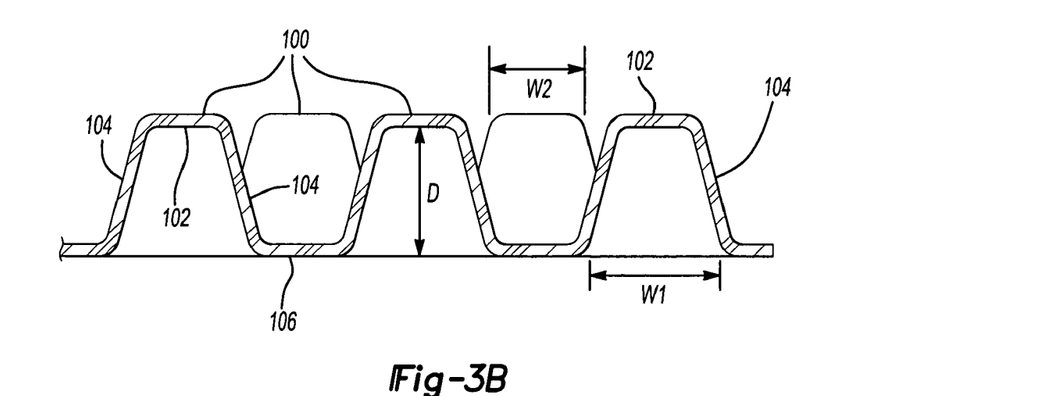

In addition to the corrugations described above, surface features in the form of protrusions may also be utilized in multilayer energy absorbers described below. Like a plurality of recesses, as seen in FIGS. 3A-3B each recess 100 has a floor 102 and at least two walls 104 (when seen in cross-section) connecting the floor 102 to the base portion 106. The floor and the walls may be linear, curvilinear, or combinations thereof when viewed in cross-section. Like corrugations, protrusions have a length L that measures the distance across and a depth D measuring the distance from the base portion 106 to the floor 102. The base width W1 is a measure of the distance between the two walls where the walls meet the base portion. The floor width W2 is a measure of the size of the floor. The protrusions are similar to the corrugations except that the protrusions are typically self-contained in that they define a discrete space. The resulting energy absorber resembles a cupcake pan like structure or an egg crate like structure.

In addition to the dimensional variation possible with corrugations, protrusions also have floor shape as another aspect of their shape that can be defined. For example, when viewed from above, as in FIG. 3A, it is apparent that the protrusions may have floor shapes that maybe round, oval, rectangular, other regular polygonal, irregular polygonal or other regular or irregular shapes. Floor shapes that provide walls of the protrusions with increased surface area are desired such as stars or X-shapes. Also, the floor shape of the protrusion need not be the same as the shape of the protrusion where it meets the base portion or the floor may be rotated compared to shape of the protrusion where it meets the base portion. Preferably, the length of the protrusion is similar to its width. The thicknesses of the base portion, walls, and/or floor may be selected to maximize energy absorption of the protrusions.

The protrusions may by be arranged in any pattern on the base portion. For example, protrusions may vary is depth, floor shape, floor thickness, wall thickness, base portion thickness across the energy absorber. Also, the protrusions may be arranged in rows, in concentric circles or ovals, at the corners of triangles, rectangles, pentagons, hexagons or higher order regular or irregular polygons.

The layer preferably generally provides a planar energy absorber, although it may be adapted to provide a multitude of planes to the energy absorber. Also, the layer may have regular or irregular shape such as those described with respect to the corrugations or protrusions, thus forming corrugations on corrugations or protrusions on protrusions, for example. Also, corrugations of one dimension may be interspersed between corrugations of another dimension. Likewise, protrusions of varying depth, for example, may be interspersed with each other. In addition, corrugations may be combined with protrusions on any layer.

The energy absorber may also include a substrate layer to which a layer is attached by adhesive, mechanical fasteners or welding, where the substrate layer is generally free of surface features and serves to increase the dimensional strength of that layer or other purposes such as improving the aesthetics of the energy absorber. The substrate may also be used to increase the frictional dissipation of energy by placing it in contact with the layer, as discussed below.

The energy absorber of the present invention may be made of any suitable material such as metals, ceramics or the like, but preferably they will be made from plastics such as thermoplastics, thermosets, combinations thereof or the like. The resultant material may be rubbery, flexible or rigid. The nature of materials selected for inclusion in the energy absorber enables the manufacture of a structure with the desired properties. For example, homopolymers such as polypropylene (PP) or polystyrene (PS) could be incorporated for rigid (e.g. "glassy") energy absorbers whereas impact modified thermoplastic polyolefin (TPO) or high impact polystyrene (HI-PS) could be incorporated for ductile (e.g. "rubbery") performance. Other examples of suitable materials include nylons, polycarbonates, polypropylenes, polyesters, polyurethanes, combinations thereof or the like. Co-polymers of the above mentioned or other polymers may also be suitable. The energy absorber could be comprised of a single layer of material (e.g. monolithic) or numerous layers (e.g. co-extruded or laminated) of materials. A fiber reinforcement may be included (e.g. glass or carbon fiber) or the material may be filled, e.g. with mineral or glass filler.

The energy absorbers may be made using any conventional techniques including extrusion, pultrusion, injection molding, blow molding, compression molding, thermoforming, or combinations thereof. The energy absorbers with a lineal profile, e.g. corrugations, are preferred because with these surface features, the energy absorbers can be formed in essentially unlimited lengths, such as by extrusion or similar methods. This permits a one step formation process, where previously two steps were required, resulting in a cost savings associated with manufacture.

Energy absorbers produced by extrusion and similar techniques are also preferred because they result in base, wall and/or floor thicknesses that are substantially constant over the length of the energy absorber. Such an energy absorber consistently absorbs energy, no matter which location on the energy absorber is tested. Furthermore, such consistency of thickness is highly reproducible through the use of extrusion and similar methods, meaning that a given length of energy absorber may be indistinguishable from any other length of energy absorber. This level of consistency drives down costs of manufacture because less is spent on wasted materials, less is spent on quality control and less is spent on production oversight.

In addition to the above benefits, extrusion and similar techniques permit the creation of energy absorbers that are not possible through thermoforming or molding techniques.

In particular, energy absorbers with corrugations having negative draft, open loop and/or closed loop formations are not suitable for thermoforming or molding because such shapes cannot be removed from the mold without causing significant deformation, and thus damage, to the energy absorber.

In one example of the manufacture of the preferred energy absorber, an unlimited length of material may be pushed or pulled (both techniques are termed extrusion herein) through a die to create the structure. Upon curing and cutting to length, the energy absorber is ready for installation. The energy absorbers with corrugations could also be produced in a one step process utilizing injection molding, blow molding, sheet molding, or another process.

The energy absorbers with protrusions may also benefit from a one step production process. For example, an energy absorber may be injection, blow or compression molded in one step.

A second embodiment of the present invention includes a multi-layer energy absorber. As seen generally in FIG. 4, each multi-layer energy absorber 200 includes at least two layers 202 and 204, each with surface features 206 and 208, with surface features of one layer being nested within the surface feature of the other layer. In one aspect, the multi-layer energy absorber has differing structures, in that the first surface features differ from the second surface features in at least one structural aspect, such as shape, depth, base width, floor width, average width, wall thickness, floor thickness, base thickness, combination thereof, or the like. In a second aspect, the multi-layer energy absorber has differing compositional aspect, in that the material of the first surface features differs from the material of the second surface features. In a third aspect, the multi-layer energy absorber utilizes friction to dissipate impact energy.

Figure 4A:
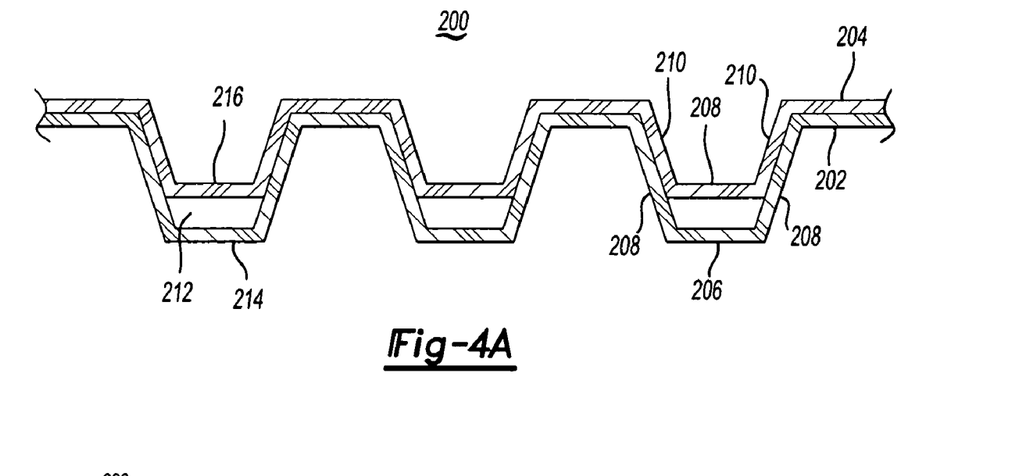
FIGS. 4A-E show cross-sectional views of several multi-layer energy absorbers.

The first aspect of the multi-layer absorber with differing structures is seen in cross-section in FIG. 4A. The first layer 202 has first corrugations 206 with walls 208 and the second layer 204 has second corrugations 208 with walls 210. As can be seen, second corrugations 208 are nested within first corrugations 206. The nested corrugations have depth dimensions that differ from each other, thus providing differing structures and a space 212 between the floors 214 and 216 of the two layers. Stated alternatively, the floors 214 and 216 are offset from each other, even though the layers 202 and 204 substantially remain adjacent to each other. In theory, the crush resistance of a material will typically be inversely proportional to the square of its depth (assuming constant wall thickness), meaning that the taller surface feature will buckle first, with the shorter feature buckling second, thus providing a two step energy absorbing feature for this embodiment. The space 212 is preferably filled with ambient air; however, it may be filled with another material such as foam, adhesive or other energy absorber. Also, preferably, walls 210 and 208 are in contact with one another, although not necessarily. For example, the walls may be separated by an adhesive or a material that raises the coefficient of friction of one or both of the walls, as discussed below.

In another aspect, the wall thicknesses may vary from one layer to the other. In theory, the crush resistance of a material will typically be proportional to the wall thickness, meaning that thicker walled surface features will buckle after (or at a higher load then) a thinner walled surface features. This is another way of providing a two step energy absorbing feature.

Figure 4B:
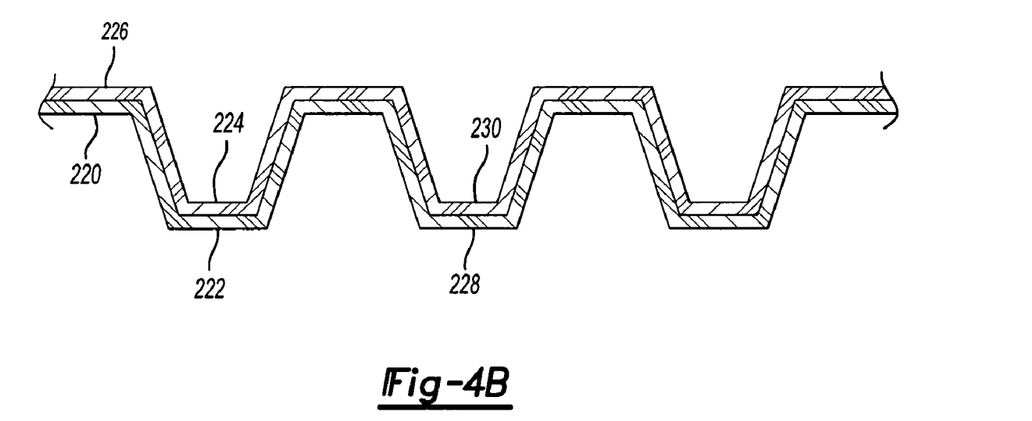

The second aspect of the multi-layer absorber with differing materials is shown in cross-section in FIG. 4B. Here, the first layer 220 includes corrugations 242 (or protrusions) into which are nested the corrugations 224 of the second layer 246 where the material of first corrugations differs from the material of the second corrugations. In this embodiment, the corrugations may be sized and shaped so that there is no appreciable space between the floors 228 and 230 of the two corrugations. The materials of the corrugations differ in their compositions and consequently their impact strength. In a preferred aspect, the first layer has a lower impact strength than the second layer. In a preferred embodiment, the differing materials of the corrugation may be combined with surface features having different structures e.g. different wall thickness.

Figure 4C:
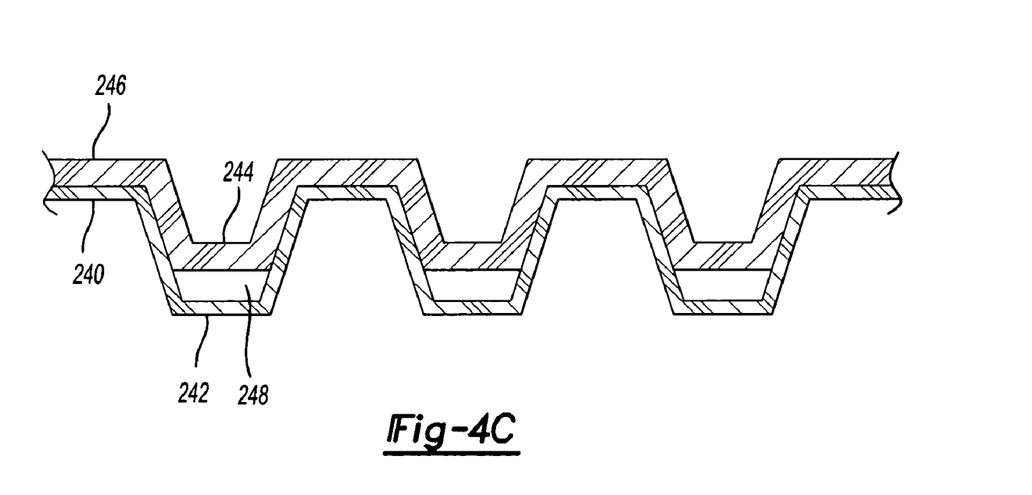

A combination of several aspects of multi-layer absorbers is shown in FIG. 4C. There, a first layer 240 with corrugations 242 have corrugations 244 from a second layer 246 nested therein. The depths of the corrugations differ resulting in a space 248 between the floors of the corrugations. The thicknesses of the base layers, walls and floors also differ from each other. For example, the ratio of the thicknesses of the base layers may range from less than about 1:4 to more than 4:1. In addition, different materials where used for each layer. This particular embodiment illustrates the use of two differing structures and differing materials in a multi-layer absorber.

A third aspect of multi-layer energy absorber utilize formuation of heat energy to dissipate impact energy, e.g., such as by friction. Friction can arise from the contact of the surface features of the layers to each other. Typically, the walls of the surface features will rub together during impact. This rubbing provides a distinct and noticeable improvement in the amount of energy absorbed by the multi-layer absorber. For example, placing a friction destroying substance, e.g. lubricant, between nested surface features reduces the energy absorbing characteristics of the multi-layer absorber.

Any material that has a high coefficient of friction is desirable as a surface feature or layer material. Such high coefficient of friction materials may have their coefficient of friction natively or as the result from the manufacturing process and/or from post manufacturing processing. In addition, the high coefficient of friction may result from the intentional formation of protrusions, valleys, micro or nano-textures or other features on the surface features. The intentionally formed features are typically relatively small in comparison to the surface features. Also, the coefficient of friction of the surface features may be increased through the use of coatings or other surface treatments such as abrasives.

In one embodiment utilizing friction, the depths of the surface features may be different, as discussed above, such that the floors are offset from each other while the layers remain adjacent to each other (See FIG. 4A). In another embodiment, the floors are offset from each other even though the depths of the surface features are about the same. In this embodiment, the layers, too would be space from each other. For example, in FIG. 4D, a first layer 250 with corrugations 252 have corrugations 254 from a second layer 256 nested therein. The depths of the corrugations differ resulting in a space 258 between the floors of the corrugations. Furthermore, there is a space 260 between the first and second layers. In a preferred embodiment, the distance between the layers is greater than the distance between the floors. In this embodiment, the amount of friction between the walls of the corrugations is increased, thus increasing the amount of impact energy dissipated by energy absorber. This embodiment may be of interest when the surface features are protrusions and the material is made by thermoforming.

Figure 4D:
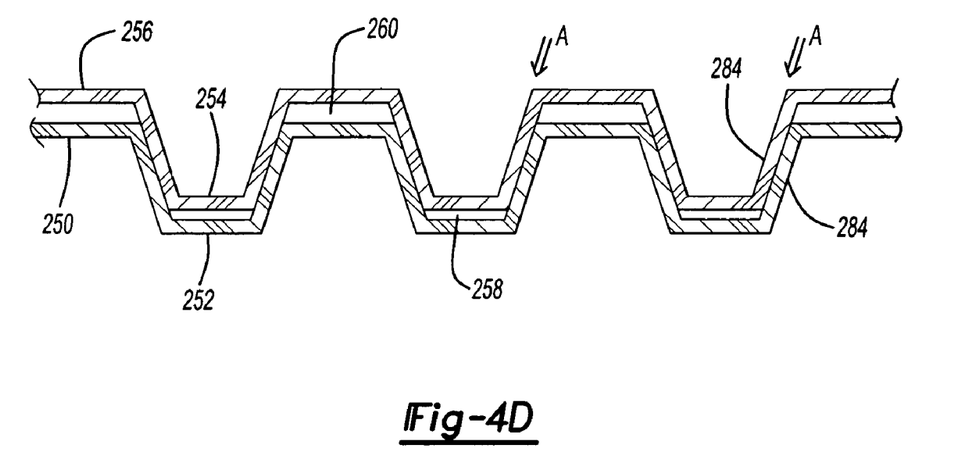

With this manufacturing technique, the protrusion may have a slight to moderate mushroom shape that would prevent the protrusions of one layer from be able to fully nest within the protrusions of the other layer.

Figure 4E:
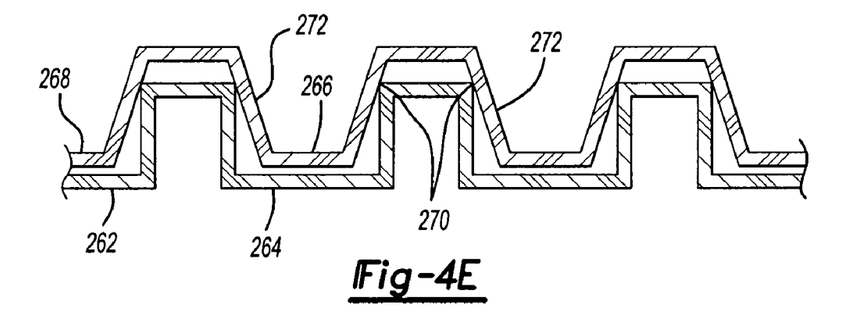

In another embodiment, positive draft surface features are combined with square wave surface features. As seen in FIG. 4E, a first layer 262 with square wave corrugations 264 have positive draft corrugations 266 from a second layer 268 nested therein. The corners 270 of the square wave corrugations 264 contact the walls 272 of the positive draft corrugations 266 somewhere between the walls meet the base and the floor. In this embodiment, the impact forces the positive draft corrugations 266 into the smaller square wave corrugations 264, thus helping dissipate energy through friction. In a preferred embodiment, it is believed that if the corners 270 contact the walls 272 nearer the floor, then more energy will be dissipated, whether by friction or another mechanism. The depths of the corrugations may be adjusted to insure that, during an impact, the floors of the two layers contact each other before, after or when the bases of the two layers contact each other.

Figure 5A:
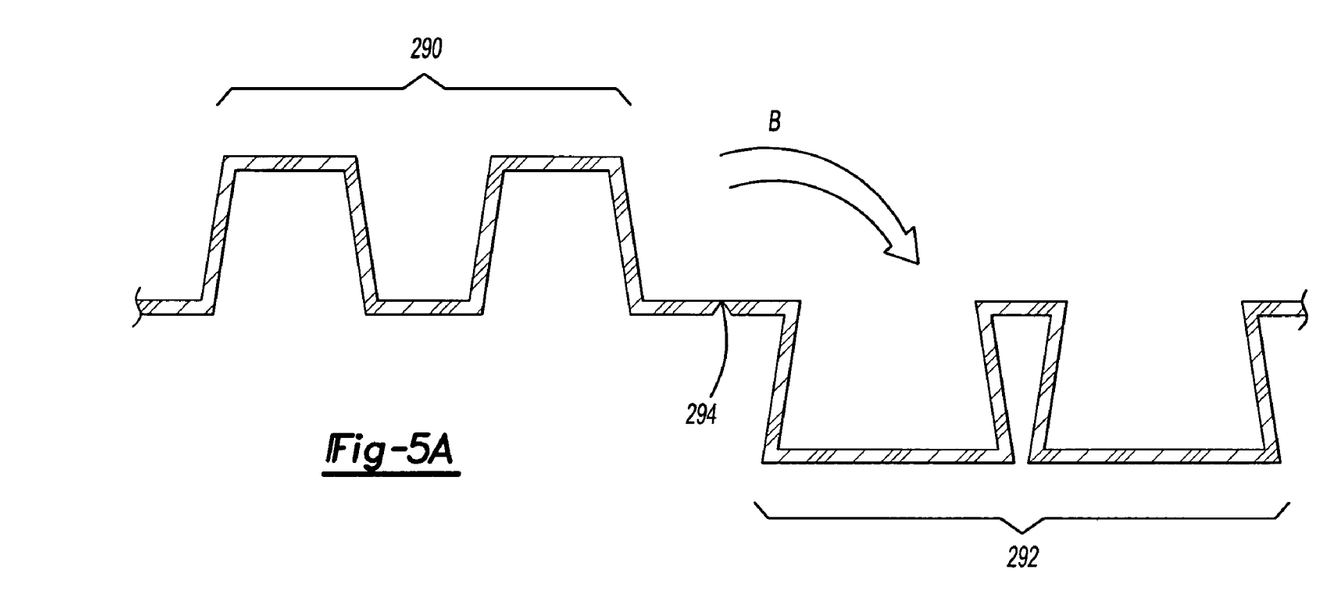
FIG. 5A-B show cross-sectional views of a raw hinged energy absorber and a completed, hinged, multi-layer energy absorber.
Figure 5B:
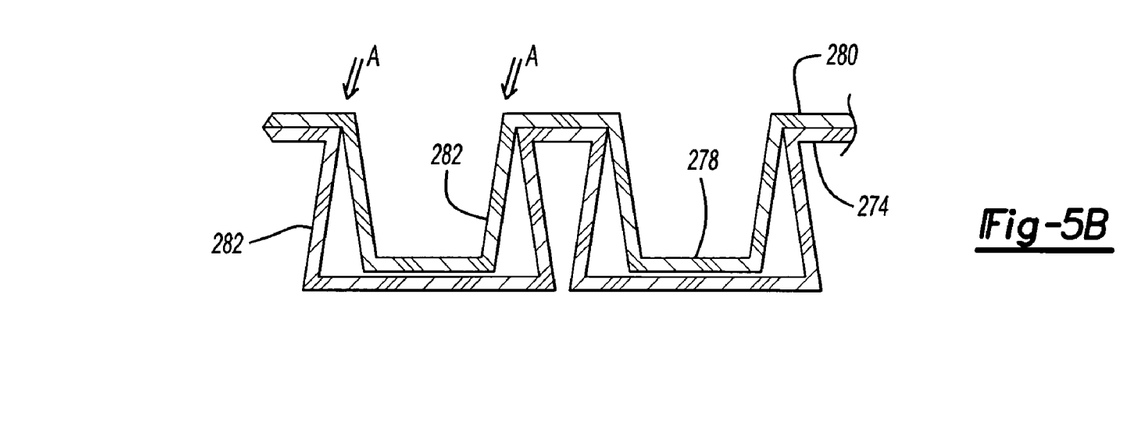

In another embodiment, positive draft surface features are combined with negative draft surface features. As seen in FIG. 5B, a first layer 274 with negative draft corrugations 276 have positive draft corrugations 278 from a second layer 280 nested therein.

One believed distinction between a two layer energy absorber and a single layer energy absorber, whether the surface features are recesses or corrugations, is an increased ability to absorb impacts that are not normal to the plane of the energy absorber. For example, comparing the single layer energy absorber in FIG. 2A with the two layer energy absorber in FIG. 5B, shows that, with a given impact angle, as shown with Arrow A, the two layer energy absorber has twice as many walls 282 that are substantially parallel to impact direction than the single layer energy absorber, thus providing more impact absorption for non-normal impacts. This is beneficial because, in real world applications, the angle of impact is rarely normal to the plane of the energy absorber. In addition, some head impact scenarios result in a combination of translational and rotational energy dissipation where it is desired to absorb impact in each potential mode. Thus, the two layer energy absorber would provide column buckling of a thermoplastic wall in a much wider range of potential impact directions as compared to a single layer energy absorber.

Between two different two layer energy absorbers, there is believed to be a benefit to spacing apart walls that are substantially parallel to one another. It is believed that energy absorbers with spaced apart walls will more consistently absorb impact energy over a given area of the energy absorber than where the walls are adjacent to one another. As seen in FIG. 5B, for example, the energy absorber has walls 282 that are parallel to one another but spaced from each other. On the other hand, as seen in FIG. 4D, the energy absorber has walls 284 that are parallel to one another but adjacent. Thus in the embodiment shown in FIG. 5B, the walls 282 are more evenly spread across an area of the energy absorber compared to the embodiment in FIG. 4D, where the walls 284 are grouped together.

While typically in the two layer energy absorber, the surface features of each layer have a common center line, this is not necessarily the case. The center lines of the surface features may be shifted.

A preferred embodiment includes friction as an energy absorbing mechanism combined with buckling or elastic deformation. One example of how friction would be used to absorb energy is that the uppermost layer may be designed to buckle at a lower stress level than the lower layer. Upon buckling, the uppermost layer may then rub on or otherwise exert stress on the walls of lower layer. The lower layer may also be designed to buckle at some predetermined stress level.

The multi-layer absorbers may be made according to manufacturing techniques discussed above or other known techniques. Preferred techniques include those where both layers are formed in a single step (or on a single machine) such as co-extrusion or co-molding. Another single step manufacturing technique for multi-layer absorbers is illustrated in FIG. 5. For example, a first portion 290 of the absorber is separated from a second portion 292 of the absorber by a hinge 294. The hinge 294 permits the first portion 290 to be folded on to the second portion 292, as indicated by Arrow B in FIG. 5A to arrive at the multi-layer energy absorber shown in FIG. 5B. As with other multi-layer absorbers, one set of surface features nest into a second set of surface features. The hinge may be any device, feature or material the permits the movement of one portion of the energy absorber relative to the other portion. The hinge is preferably one that is formed in the same process as the surface features such that the hinge is integral to the energy absorber. For example, the hinge may be a valley, groove, other depression, thinning or other formation that imparts flexibility to material of the energy absorber at that location. Other hinges may also be suitable such as after formed valleys or thinning of the material of the energy absorber. Likewise, the two portions of the energy absorber may be manufactured and then attached via a hinge.

Other suitable manufacturing techniques include those where each layer is made in a single step (or their own machine) and then the layers are combined to form the multi-layer absorber. Suitably, each layer may also be made with a multi-step process.

Materials for the multi-layer absorber may be selected from those described above with respect to the single layer energy absorbers. In addition, other components may be included to increase the energy absorbing of the multi-layer absorber such as batting, foams, adhesives and combinations thereof.

The layers of the multi-layer energy absorber may be attached to each other through mechanical fasters, adhesives, welding or friction. Suitable adhesives include those discussed above. Welding may be accomplished through the use of heat (e.g. spot welding) or through the use some other electromagnetic energy (e.g. ultrasonic welding).

The present invention also includes methods of absorbing energy during an impact. For example, energy may be absorbed by providing an energy absorbing structures with corrugations and impacting the material with an object during a vehicle accident. Also, energy may be absorbed by providing a two layer energy absorbing structure and dissipating impact energy through friction. Dissipating impact energy may also be accomplished by sequentially or simultaneously employing at least two different structures or materials.

The materials of the present invention may be used in any type of device, apparatus or structure that is in need of impact energy absorbing characteristics. Preferred uses include in transportation vehicles such as fixed and rotary wing aircraft, spacecraft, buses, trains, subways, semi-trucks, pickup trucks, SUVs, and other passenger vehicles. Within these vehicles the energy absorbing structures preferably may be used in headliners, doors, bumpers, knee bolsters, seats, seat backs, floors, instrument panels and combinations thereof or the like.

EXAMPLES

Computer aided engineering (CAE) was utilized to predict the characteristics of the present materials as compared to known materials. First, two layer energy absorber with differing depths of surface features (e.g. as shown in FIG. 4D) were compared to STRANDFOAM EA 1000, a known foamed energy absorber. The results are shown in Table 1, where HIC is the "Head Injury Criterion", the HIC(d) is a function of both acceleration time history and the peak acceleration value, and the HIC(d)norm is normalized for thickness.

TABLE 1

| Name | Description | Total Thickness | HIC(d) | HIC(d)norm |
|---|---|---|---|---|
| Conical Structure 005 | 24 mm PS–>19 mm PE | 25 mm | 861 | 861 |
| Conical Structure 105 | 24 mm PS–>19 mm PE | 25 mm | 859 | 859 |
| Conical Structure 107 | 19 mm PE–>24 mm PS | 30 mm | 948 | 1138 |
| Conical Structure 108 | 19 mm PE–>24 mm PS | 30 mm | 922 | 1106 |
| Strandfoam EA 1000 | Foamed material | 25 mm | 793 | 793 |

Thus, a double layer conical structure comprised of 24 mm PS sheet being forced into a 19 mm PE sheet exhibits approximately 8% higher HIC(d) values than Strandfoam EA 1000, respectively. In addition, the data also demonstrates that forcing a weaker (e.g. taller) sheet into a stiffer (e.g. shorter) sheet improves normalized impact performance approximately 25% with the same weight.

In another series of experimental tests, the effect of friction was investigated using CAE. Experimental tests on double layer conical structures with a 5 mm offset distance give the following results (utilizing structures such as seen in FIG. 3):

TABLE 2

| Description | Comments | Total Thickness | HIC(d) |
|---|---|---|---|
| 24 mm PS–>24 mm PS | Control | 29 | 510 |
| 24 mm PS–>24 mm PS | Control | 29 | 535 |
| 24 mm PS–>24 mm PS | Lubricated cones | 29 | 557 |
| 24 mm PS–>24 mm PS | Lubricated cones | 29 | 583 |

Thus, the data demonstrates that the frictional dissipation provided by a 5 millimeter offset improves head impact protection by approximately 10% versus similar samples with a lubricating agent.

The single layer corrugated portion of the invention utilizes simple—yet energy absorbing efficient—geometrical features fabricated with low cost raw materials and technologies, capable to match or improve the energy absorbing performance of current art. The double layer portion of the invention effectively utilized dual buckling and frictional dissipation energy absorption mechanisms yielding improved efficiency against single layer current art solutions.

In other computer aided engineering simulations, 20 millimeter thick corrugated and conical thermoplastic structures were impacted against an experimental two-piece body-in-white (BIW) assembly with a 115 millimeter length and a mean BIW HIC(d) value of approximately 1,500. Each structure was modeled using polypropylene impact copolymer thermoplastic resin (INSPIRE C702-20). Each simulation assumed the corrugated structures are bonded to a 0.75 millimeter thick plate that simulated a headliner substrate. The data demonstrates an approximate 14% and 17% improvement in the impact criterion for both negative and positive draft corrugated part designs, respectively. Each of these comparisons is based upon a single layer vacuum thermoformed conical structure.

Thinning effects of the base layer or surface feature walls are typically encountered in vacuum thermoforming manufacturing processes. In an effort to quantify such effects, measurements were taken in various location of a single layer vacuum thermoformed conical structure. The conical structures were approximately 24 millimeters deep. The wall thickness can vary as much as 40-50% from the base sheet thickness in a vacuum thermoforming process. Thus, in order to achieve computer aided performance modeled with a 1.0-millimeter uniform wall thickness, a 1.6-millimeter base sheet thickness would be required for single layer conical vacuum thermoformed products. A part weight comparison of corrugated and vacuum thermoformed conical energy absorbing parts shows that, for comparable impact performance, a mere 0.0065 kg mass increase is required for a single layer corrugated energy absorbing structure versus a single layer vacuum thermoformed conical parts.

Additional CAE simulations are performed on positive draft corrugated energy absorbing structures with varying draft angles. Each structure is modeled with a 0.75-millimeter base thickness and a 1.75-millimeter wall thickness whereas the overall thickness is held constant at 20 millimeters. The resultant data demonstrated that optimal performance can be achieved with a positive draft angle of between about 0° and about 10°.

Finally, a series of CAE simulations are performed on positive draft corrugated structures with varying numbers (3<N<6) of corrugations. Each structure is modeled with a 0.75-millimeter base thickness, a 1.75-millimeter wall thickness and a 9.2° draft angle. Each simulation is performed with a 115 millimeter length and a part width of 100-millimeters. As the number of corrugations increases, the base width (11.5 mm<w<4.7 mm) of the corrugation decreases. Impact performance of positive draft corrugated part designs is measured as a function of the number of corrugations. The data demonstrates that sheet thickness decreases as the number of corrugations increases. Thus, part weight reduction could be achieved by increasing the number of corrugations in a given part design.

It will be further appreciated that functions or structures of a plurality of components or steps may be combined into a single component or step, or the functions or structures of one step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. An article of manufacture, comprising:
an energy absorber comprising an extruded plastic first layer having a first plurality of corrugations separated by a hinge from a second plurality of corrugations, wherein the length of the corrugations are longer than their widest cross-sectional width.

2. The article of claim 1, wherein individual corrugations of the first plurality are nested within individual corrugations of the second plurality after actuation of the hinge.

3. The article of claim 2, wherein the first and second pluralities of corrugations differ from each other in at least one structural or compositional aspect.

4. The article of claim 3, wherein the at least one structural aspect is selected from height, base width, floor width, average width, cross-sectional shape, base layer thickness, wall thickness, floor thickness and combinations thereof.

5. The article of claim 4, wherein cross-sectional shape is selected from square waveform, positive draft, negative draft, sinusoidal waveform, open loop shape, closed loop shape and combinations thereof.

6. The article of claim 4, wherein the differing structural aspect results in frictional energy dissipating during an impact.

7. The article of claim 6, wherein the differing structural aspect is depth.

8. The article of claim 3, wherein the first and second pluralities differ in composition.

9. An article of manufacture, comprising:
an energy absorber comprising an extruded plastic first layer having a first plurality of corrugations and an extruded plastic second layer having a second plurality of corrugations and wherein individual corrugations of the first plurality are nested within individual corrugations of the second plurality and wherein the first and second layers differ from each other in at least one structural or compositional aspect.

10. The article of claim 9, wherein the at least one structural aspect is selected from height, base width, floor width, average width, cross-sectional shape, base layer thickness, wall thickness, floor thickness and combinations thereof.

11. The article of claim 10, wherein cross-sectional shape is selected from square waveform, positive draft, negative draft, sinusoidal waveform, open loop shape, closed loop shape and combinations thereof.

12. The article of claim 10, wherein the differing structural aspect results in frictional energy dissipating during an impact.

13. The article of claim 12, wherein the differing structural aspect is depth.

14. The article of claim 9, wherein the first and second layers differ in composition.

15. An energy absorbing structure, comprising:
a energy absorber comprising a first plastic layer having a first plurality of surface features and a second plastic layer with a second plurality of surface features wherein the surface features of one layer are nested within the surface features of the other layer and wherein the first and second layers differ from each other in at least one structural or compositional aspect.

16. The article of claim 15, wherein the at least one structural aspect is selected from height, base width, floor width, average width, cross-sectional shape, base layer thickness, wall thickness, floor thickness and combinations thereof.

17. The article of claim 16, wherein cross-sectional shape is selected from square waveform, positive draft, negative draft, sinusoidal waveform, open loop shape, closed loop shape and combinations thereof.

18. The article of claim 16, wherein the differing structural aspect results in frictional energy dissipating during an impact.

19. The article of claim 18, wherein the differing structural aspect is depth.

20. The article of claim 15, wherein the first and second layers differ in composition.

21. A method of manufacturing an energy absorber, comprising:
nesting individual surface features of a first plurality of surface features on a first plastic layer into individual surface features of a second plurality of surface features on a second plastic layer, wherein the first and second layers differ from each other in at least one structural or compositional aspect.

22. The method of claim 21, further comprising extruding a first layer comprising the first plurality of surface features.

23. The method of claim 22, further comprising extruding a second layer comprising the second plurality of surface features.

24. The method of claim 21, further comprising extruding a first layer comprising the first and second plurality of surface features.

25. The method of claim 24, wherein the nesting step comprises actuating a hinge that separates the first plurality and second plurality of surface features.

26. A method of manufacturing an energy absorber, comprising:
extruding a first layer comprising a first and a second plurality of surface features, wherein the first and second plurality of surface features are separated by a hinge.

27. The method of claim 26, further comprising nesting individual surface features of the first plurality of surface features into individual surface features of the second plurality of surface features.

28. The method of claim 27, wherein the first and second plurality of surface features are formed with at least one differing structural or compositional aspect.

* * * * *